(12) United States Patent
Haga et al.

(10) Patent No.: US 10,374,480 B2
(45) Date of Patent: Aug. 6, 2019

(54) MOTOR (71) Applicant: NIDEC CORPORATION, Kyoto (JP)

(72) Inventors: Hidehiro Haga, Kyoto (JP); Yu Asahi, Kyoto (JP); Takao Atarashi, Kyoto (JP); Shunsuke Murakami, Kyoto (JP); Satomi Takei, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 33 days.

(21) Appl. No.: 15/751,182

(22) PCT Filed: Aug. 5, 2016

(86) PCT No.: PCT/JP2016/073187
§ 371 (c)(1),
(2) Date: Feb. 8, 2018

(87) PCT Pub. No.: WO2017/026413
PCT Pub. Date: Feb. 16, 2017

(65) Prior Publication Data
US 2018/0233985 A1 Aug. 16, 2018

(30) Foreign Application Priority Data

Aug. 10, 2015 (JP) .................................. 2015-158395

(51) Int. Cl.
| H02K 11/00 | (2016.01) |
| H02K 3/50 | (2006.01) |
| H02K 3/38 | (2006.01) |
| H02K 1/27 | (2006.01) |
| H02K 5/173 | (2006.01) |

(52) U.S. Cl.
CPC ............... *H02K 3/50* (2013.01); *H02K 3/38* (2013.01); *H02K 1/2753* (2013.01); *H02K 5/1732* (2013.01); *H02K 2203/09* (2013.01)

(58) Field of Classification Search
CPC .......... H02K 3/50; H02K 3/38; H02K 1/2753; H02K 5/1732; H02K 2203/09
See application file for complete search history.

(56) References Cited

U.S. PATENT DOCUMENTS 9,780,617 B2   10/2017  Houzumi et al.
2012/0091840 A1*  4/2012  Nakanishi .............. H02K 3/522
                                                              310/71

(Continued)

FOREIGN PATENT DOCUMENTS

JP   2010141953 A   6/2010
JP   2010-220289 A  9/2010

(Continued)

*Primary Examiner* — Thanh Lam
(74) *Attorney, Agent, or Firm* — Viering, Jentschura & Partner MBB (57) ABSTRACT

A motor includes a shaft disposed along a central axis extending in an up-down direction, a rotor assembly mounted on the shaft, a stator radially facing the rotor assembly with a clearance therebetween, and a plurality of busbars electrically connected to the stator. The busbar includes a first busbar and a second busbar. The first busbar has an upper disposed portion that is disposed above the second busbar. The second busbar has a busbar cavity that is recessed downward at a position that overlaps with the upper disposed portion in an axial direction.

15 Claims, 5 Drawing Sheets

(56) References Cited

U.S. PATENT DOCUMENTS

| | | | |
|---|---|---|---|
| 2012/0112582 A1* | 5/2012 | Kim | B62D 5/0403 310/71 |
| 2013/0038152 A1* | 2/2013 | Woo | H02K 3/522 310/71 |
| 2013/0234549 A1* | 9/2013 | Egami | H02K 3/28 310/71 |
| 2014/0001896 A1* | 1/2014 | Ryu | H02K 5/225 310/71 |
| 2014/0246934 A1* | 9/2014 | Egami | H02K 3/522 310/71 |

FOREIGN PATENT DOCUMENTS

| | | |
|---|---|---|
| JP | 2011-120413 A | 6/2011 |
| JP | 2014-204528 A | 10/2014 |
| KR | 10-1242409 B1 | 3/2013 |

\* cited by examiner

MOTOR

RELATED APPLICATIONS

The present application is a national stage entry according to 35 U.S.C. § 371 of PCT application No.: PCT/JP2016/073187 filed on Aug. 5, 2016, which claims priority from Japanese application No. 2015-158395 filed on Aug. 10, 2015, is incorporated herein by reference in its entirety.

FIELD OF THE INVENTION

The present disclosure relates to a motor.

DESCRIPTION OF THE RELATED ART

Conventionally, there is known a motor that includes a plurality of busbars. For example, a motor disclosed in Japanese Patent Application Laid-Open No. 2010-141953 includes a plurality of busbars that are inserted in circular ring-shaped grooves that are formed at predetermined intervals on concentric circles in an insulating holding member.

In a motor such as that described above, for example when a hook portion of a coil connector of each busbar is disposed on the circumference of the same circle, the coil connector of one busbar may need to be placed, passing over the other busbars.

With the structure disclosed in Japanese Patent Application Laid-Open No. 2010-141953, the coil connector of a busbar has a standing portion that extends upward, and this upward extension of the coil connector ensures insulation between the busbar and the other busbars. There is, however, a problem with this structure in that the axial dimension of the busbar is increased by an amount equal to the standing portion, which results in an increase in the axial dimension of the motor as a whole and, accordingly, an increase in the size of the motor.

SUMMARY OF THE INVENTION

A motor according to one aspect of the present disclosure includes a shaft disposed along a central axis that extends in an up-down direction, a rotor assembly mounted on the shaft, a stator radially facing the rotor assembly with a clearance therebetween, and a plurality of busbars electrically connected to the stator. The busbars include a first busbar and a second busbar. The first busbar has an upper disposed portion that is disposed above the second busbar. The second busbar has a busbar cavity that is recessed downward at a position that overlaps with the upper disposed portion in the axial direction.

The above and other elements, features, steps, characteristics and advantages of the present discloser will become more apparent from the following detailed description of the preferred embodiments with reference to the attached drawings.

DETAILED DESCRIPTION OF THE PREFERRED EMBODIMENTS

A motor according to a preferred embodiment of the present disclosure will be described hereinafter with reference to the drawings. In the specification of the present invention, the upper side in FIG. 1 in the axial direction of a central axis J that extends in the up-down direction is simply referred to as the "upper side," and the lower side in FIG. 1 simply as the "lower side." The term "up-down direction" as used herein indicates neither positional relationship nor direction at the time when the motor is incorporated in actual equipment. A direction parallel to the central axis J is referred to as the "axial direction," a radial direction from the central axis J is simply referred to as the "radial direction," and a circumferential direction around the central axis J is simply referred to as the "circumferential direction."

The words "extends in the axial direction" as used in the specification of the present invention include not only the case where an object extends strictly in the axial direction, but also cases where the object extends in directions that are inclined within a range of less than 45 degrees with respect to the axial direction. The words "extends in the radial direction" as used in the specification of the present invention include not only the case where an object extends strictly in the radial direction, i.e., in the direction perpendicular to the axial direction, but also cases where the object extends in directions that are inclined within a range of less than 45 degrees with respect to the radial direction.

Figure 1:
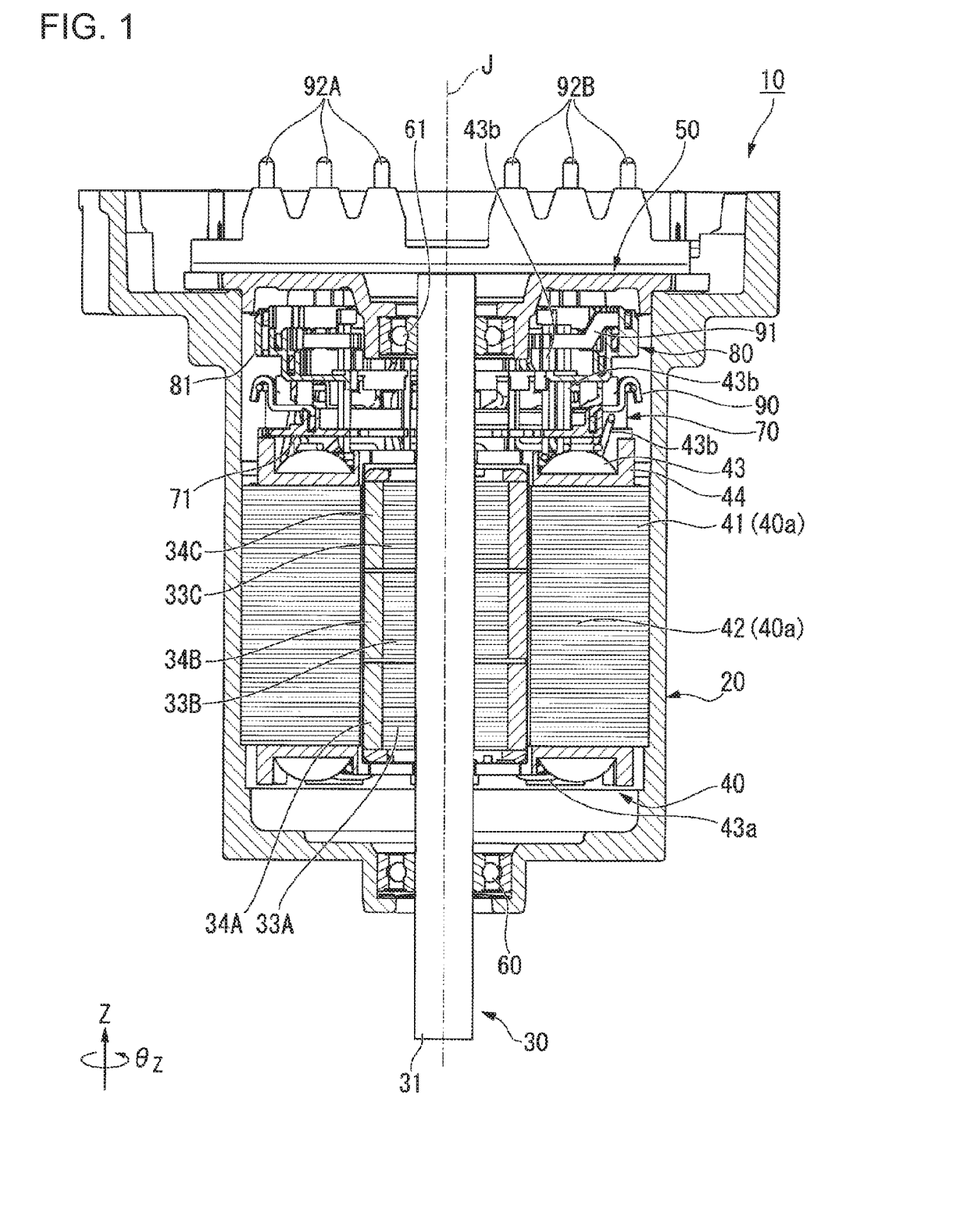
FIG. 1 is a cross-sectional view of a motor according to a preferred embodiment.

As illustrated in FIG. 1, a motor 10 according to the preferred embodiment is an inner rotor type motor. The motor 10 includes a housing 20, a rotor 30, a tubular stator 40, a bearing holder 50, a lower bearing 60 held by the housing 20, an upper bearing 61 held by the bearing holder 50, a lower busbar assembly 70, an upper busbar assembly 80, and terminals 92A and 92B. The housing 20 is capable of housing each part.

The rotor 30 includes a shaft 31 disposed along the central axis J, a first rotor core 33A, a second rotor core 33B, a third rotor core 33C, a first magnet 34A, a second magnet 34B, and a third magnet 34C. The shaft 31 is supported by the lower bearing 60 and the upper bearing 61 so as to be rotatable about the central axis J. The rotor 30 is rotatable relative to the stator 40 radially inside the stator 40. In other words, the stator 40 surrounds the rotor 30.

The first rotor core 33A, the second rotor core 33B, and the third rotor core 33C have tubular shapes. The first rotor core 33A, the second rotor core 33B, and the third rotor core 33C are arranged in this order from the lower side to the upper side in the axial direction. In the preferred embodiment, the inner side surfaces of the first rotor core 33A, the second rotor core 33B, and the third rotor core 33C have cylindrical shapes centered on the central axis J. The first rotor core 33A, the second rotor core 33B, and the third rotor core 33C are fitted and fixed to the shaft 31 by press fitting or other suitable methods. Alternatively, the first rotor core 33A, the second rotor core 33B, and the third rotor core 33C may be indirectly fixed to the shaft 31 via other members.

In the preferred embodiment, the first magnet 34A, the second magnet 34B, and the third magnet 34C have plate-like shapes extending in the circumferential direction. The first magnet 34A is fixed to the outer side surface of the first rotor core 33A. The second magnet 34B is fixed to the outer side surface of the second rotor core 33B. The third magnet 34C is fixed to the outer side surface of the third rotor core 33C.

There are a plurality of first magnets 34A, a plurality of second magnets 34B, and a plurality of third magnets 34C, each provided in the circumferential direction. Alternatively, each of the first magnet 34A, the second magnet 34B, and the third magnet 34C may be a single member. In this case, the first magnet 34A, the second magnet 34B, and the third magnet 34C may have a circular ring shape.

The stator 40 radially faces the rotor 30 with a clearance in between. The stator 40 is disposed radially outward of the rotor 30. The stator 40 includes a stator core 40a, a plurality of coils 43, and a plurality of insulators 44. The stator core 40a may be configured by laminating a plurality of electromagnetic steel sheets. The stator core 40a includes a ring-shaped core back 41 that extends in the circumferential direction, and a plurality of teeth 42 that extend in the radial direction from the core back 41. That is, the stator 40 includes the core back 41 and the teeth 42.

In the preferred embodiment, the core back 41 has a circular ring shape centered on the central axis J. The outer circumferential surface of the core back 41 is fixed to the inner circumferential surface of the housing 20 by press fitting or other suitable methods. In the preferred embodiment, the teeth 42 extend radially inward from the inner side surface of the core back 41. The teeth 42 are disposed at equal intervals in the circumferential direction.

The coils 43 consist of conductive wires 43a wound around the teeth 42 via the insulators 44. The coils 43 are disposed respectively on the teeth 42. The coils 43 have coil ends 43b that are ends of the conductive wires 43a. The coil ends 43b extend upward from portions of the coils 43 that are would around the teeth 42. At least parts of the insulators 44 are disposed between the teeth 42 and the coils 43. The insulators 44 cover at least parts of the teeth 42.

The lower busbar assembly 70 has an approximately cylindrical shape. The lower busbar assembly 70 is disposed above the stator 40. The lower busbar assembly 70 includes a neutral busbar 90 and a lower busbar holder 71 that has an approximately cylindrical shape and holds the neutral busbar 90. That is, the motor 10 includes the neutral busbar 90 and the lower busbar holder 71.

In the preferred embodiment, the lower busbar holder 71 is made of a resin having insulating properties. The lower busbar holder 71 is fixed to the insulators 44. The neutral busbar 90 is electrically connected to the coils 43. To be more specific, the neutral busbar 90 is connected to the coil ends 43b. Thus, the neutral busbar 90 is electrically connected to the stator 40. The neutral busbar 90 serves as a neutral point that connects the plurality of coil ends 43b.

The upper busbar assembly 80 has an approximately cylindrical shape. The upper busbar assembly 80 is disposed above the lower busbar assembly 70. The upper busbar assembly 80 includes a phase busbar 91 and an upper busbar holder 81 that holds the phase busbar 91. That is, the motor 10 includes the phase busbar 91 and the upper busbar holder 81.

The upper busbar holder 81 has an approximately cylindrical shape. In the preferred embodiment, the upper busbar holder 81 is made of a resin having insulating properties. The upper busbar holder 81 is fixed to the housing 20. The phase busbar 91 is electrically connected to the coils 43. To be more specific, the phase busbar 91 is connected to the coil ends 43b. The phase busbar 91 is connected to the terminals 92A and 92B. Thus, the phase busbar 91 is electrically connected to the stator 40.

The terminals 92A and 92B are plate-like members extending upward. The upper ends of the terminals 92A and 92B are located above the upper end of the housing 20. The terminals 92A and 92B are connected to external power sources (not shown).

Figure 2:
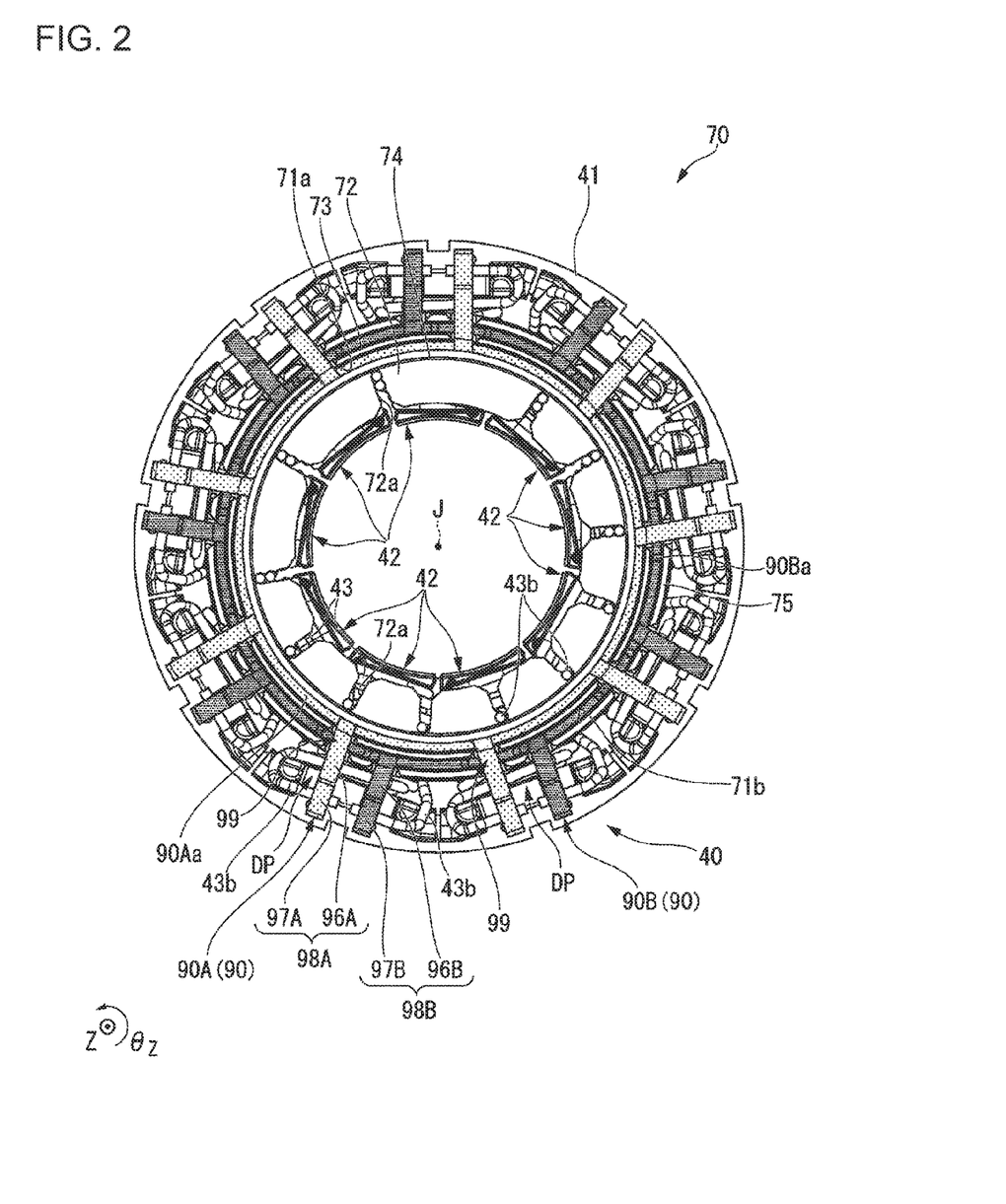
FIG. 2 is a plan view of a lower busbar assembly according to the preferred embodiment.

As illustrated in FIG. 2, the lower busbar holder 71 has a first coil support 72, a lower holder tubular portion 73, an inner circumferential wall 74, and an outer circumferential wall 75.

The first coil support 72 has an approximately circular ring plate-like shape centered on the central axis J. The first coil support 72 is located above the coils 43. The first coil support 72 has first supporters 72a that support the coil ends 43b. These supporters allow the conductive wires 43a of the coils 43 to be routed with ease while ensuring insulation.

The first supporters 72a are cavities that are recessed radially outward from the inner edge of the first coil support 72. The coil ends 43b pass through the inside of the first supporters 72a. The coil ends 43b, passing through the inside of the first supporters 72a, are supported from their both circumferential sides by the inner side surfaces of the first supporters 72a.

The lower holder tubular portion 73 has a cylindrical shape centered on the central axis J. The lower holder tubular portion 73 extends upward from the first coil support 72. The inner circumferential wall 74 and the outer circumferential wall 75 have approximately ring shapes extending in the circumferential direction. The inner circumferential wall 74 is located radially inward of the lower holder tubular portion 73 and extends upward from the first coil support 72. The outer circumferential wall 75 is located radially outward of the lower holder tubular portion 73 and extends upward from the first coil support 72.

The lower busbar holder 71 has a first lower groove 71a and a second lower groove 71b that are recessed downward and extend in the circumferential direction. The first lower groove 71a is located between the lower holder tubular portion 73 and the inner circumferential wall 74 in the radial direction. The second lower groove 71b is located between the lower holder tubular portion 73 and the outer circumferential wall 75 in the radial direction.

The neutral busbar 90 includes a first busbar 90A and a second busbar 90B. The first busbar 90A has a first busbar body portion 90Aa that extends in the circumferential direction, and first connection terminals 98A that extend in the radial direction from the first busbar body portion 90Aa.

The first busbar body portion 90Aa has an approximately ring shape in plan view. The first busbar body portion 90Aa is disposed in the first lower groove 71a. The first busbar body portion 90Aa is fitted in the first lower groove 71a.

The first connection terminals 98A extend radially outward from the first busbar body portion 90Aa. In the preferred embodiment, the first busbar 90A includes nine first connection terminals 98A. The first connection terminals 98A are arranged at approximately equal intervals in the circumferential direction.

The first connection terminals 98A each include a first extension 96A and a first connector 97A. That is, the first busbar 90A includes the first extensions 96A and the first connectors 97A.

The first extensions 96A extend in the radial direction from the first busbar body portion 90Aa. The first connectors 97A are disposed at the radial ends of the first extensions 96A and connected to the coil ends 43b.

Figure 3:
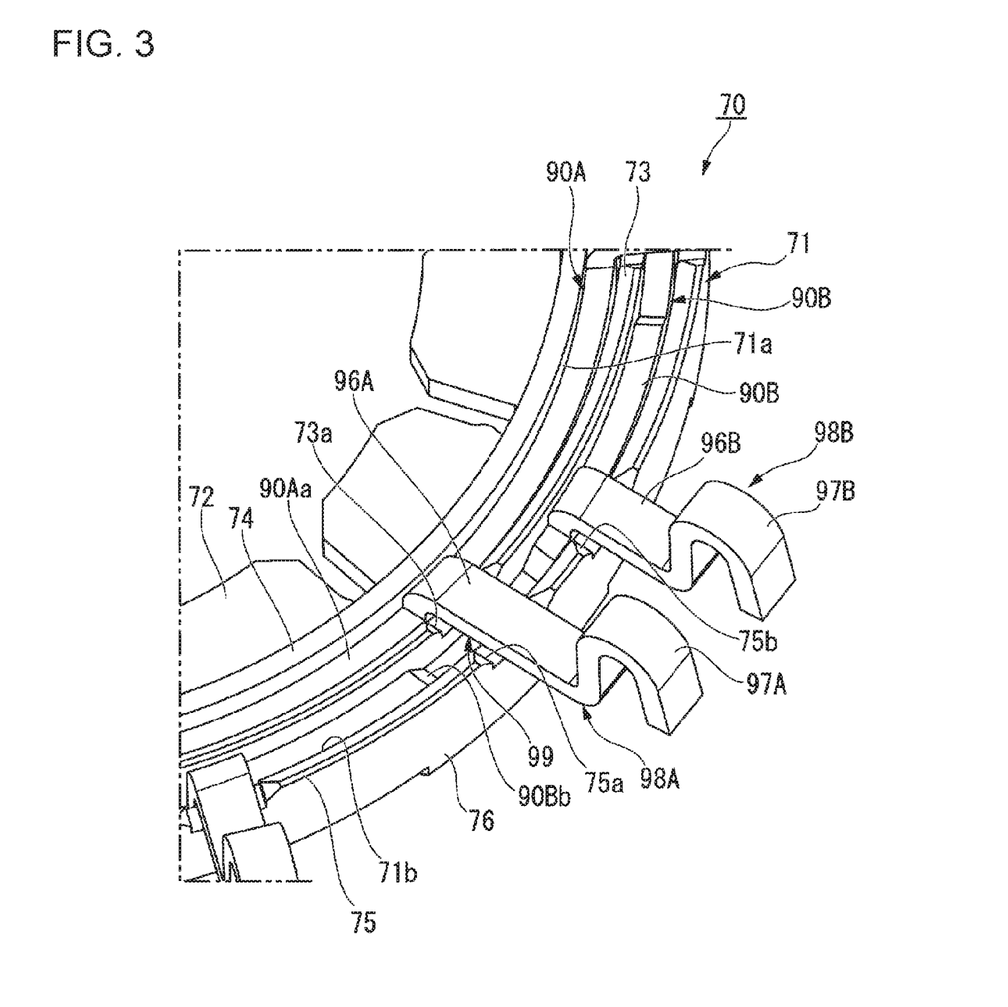
FIG. 3 is a perspective view of part of the lower busbar assembly according to the preferred embodiment.

As illustrated in FIG. 3, the first connectors 97A have a U-shape. Thus, the first connectors 97A can hold the coil ends 43b when the lower busbar assembly 70 is disposed above the stator 40. This eases the establishment of connection between the first connectors 97A and the coil ends 43b.

The first connectors 97A have an U-shape that opens downward. Thus, the first connectors 97A can easily grasp the coil ends 43b when the lower busbar assembly 70 is disposed above the stator 40. To be more specific, the first connectors 97A can easily grasp routing wires, when the lower busbar assembly 70 is disposed above the stator 40. This allows the first connectors 97A to be disposed with ease on the coil ends 43b.

As illustrated in FIG. 2, the second busbar 90B has a second busbar body portion 90Ba that extends in the circumferential direction, and second connection terminals 98B that extend in the radial direction from the second busbar body portion 90Ba.

The second busbar body portion 90Ba has an appropriately ring shape in plan view. The second busbar body portion 90Ba is disposed in the second lower groove 71b. The second busbar body portion 90Ba is fitted in the second lower groove 71b.

The first busbar body portion 90Aa and the second busbar body portion 90Ba are at the same position in the axial direction. The first busbar body portion 90Aa and the second busbar body portion 90Ba overlap each other in the radial direction.

The second connection terminals 98B extend radially outward from the second busbar body portion 90Ba. In the preferred embodiment, the second busbar 90B includes nine second connection terminals 98B. The second connection terminals 98B are arranged at approximately equal intervals in the circumferential direction.

The second connection terminals 98B each include a second extension 96B and a second connector 97B. That is, the second busbar 90B includes the second extensions 96B and the second connectors 97B.

The second extensions 96B extend in the radial direction from the second busbar body portion 90Ba. The second connectors 97B are disposed at the radial ends of the second extensions 96B and connected to the coil ends 43b. The second connectors 97B have the same shape as the first connectors 97A.

In the preferred embodiment, the first connectors 97A and the second connectors 97B are at the same position in the axial direction. Thus, the connectors and the coil ends 43b can be connected at the same axial position. This eases the operation of connecting the first and second busbars 90A and 90B with the coil ends 43b during the manufacture of the motor 10.

As illustrated in FIG. 3, the first busbar 90A has upper disposed portions 99 that are disposed above the second busbar 90B. The upper disposed portions 99 are parts of the first connection terminals 98A. To be more specific, the upper disposed portions 99 are parts of the first extensions 96A.

Thus, the first connectors 97A to be connected to the coil ends 43b can be disposed with ease at positions that do not overlap with the second busbar 90B in the axial direction. This eases the establishment of connection between the first connectors 97A and the coil ends 43b. Moreover, the first connectors 97A and the second connectors 97B can be disposed with ease at the same radial position. This improves efficiency in the operation of connecting the connectors and the coil ends 43b.

The second busbar 90B has busbar cavities 90Bb that are recessed downward at positions that overlap with the upper disposed portions 99 in the axial direction. Thus, even if the axial position of the upper disposed portions 99 comes close to the second busbar 90B, the busbar cavities 90Bb ensure a distance for insulation between the first busbar 90A and the second busbar 90B. Accordingly, it is possible to ensure insulation between a plurality of busbars while suppressing an increase in the axial dimension of the motor 10 and, accordingly, an increase in the size of the motor 10.

The busbar cavities 90Bb are positioned in the second busbar body portion 90Ba. As described above, the upper disposed portions 99 are parts of the first connection terminals 98A. Thus, for example, the first busbar body portion 90Aa and the second busbar body portion 90Ba are disposed at the same position in the axial direction. In that case, even if the axial position of the first connection terminals 98A is approximately the same as the axial position of the first busbar body portion 90Aa, the busbar cavities 90Bb ensure a distance for insulation between the first connection terminals 98A and the second busbar body portion 90Ba. Accordingly, it is possible to ensure insulation between a plurality of busbars while further suppressing an increase in the axial dimension of the motor 10 and, accordingly, an increase in the size of the motor 10.

Figure 4:
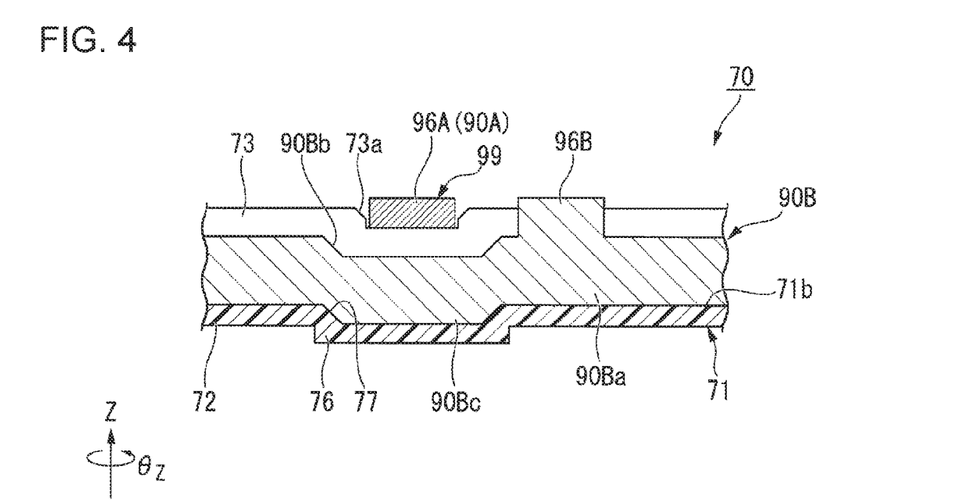
FIG. 4 is a cross-sectional view of part of the lower busbar assembly according to the preferred embodiment.

In FIG. 4, the internal shape of the busbar cavities 90Bb, when viewed in the radial direction, is a trapezoidal shape whose upper base is longer than the lower base. There are no particular limitations on the internal shape of the busbar cavities 90Bb when viewed in the radial direction, and the internal shape of the busbar cavities 90Bb may be other shapes such as a semicircular shape, a semi-oval shape, or a polygonal shape. The busbar cavities 90Bb are open on both radial sides of the second busbar body portion 90Ba as illustrated in FIG. 3.

As illustrated in FIG. 4, the second busbar body portion 90Ba has busbar protrusions 90Bc that protrude downward at positions that overlap with the busbar cavities 90Bb in the axial direction. Thus, the axial dimension of the portions at which the busbar cavities 90Bb are positioned on the second busbar body portion 90Ba may be made equal to the axial dimension of the portions that are positioned on the both circumferential sides of the busbar cavities 90Bb on the second busbar body portion 90Ba.

For example, if the axial dimension of the second busbar body portion 90Ba decreases partially due to the presence of the busbar cavities 90Bb, the portions of the second busbar body portion 90Ba where the busbar cavities 90Bb are positioned will have a reduced cross-sectional area orthogonal to the circumferential direction. In this case, the electrical resistance of the second busbar body portion 90Ba will increase partially. As a result, the portions of the second busbar body portion 90Ba where the busbar cavities 90Bb are positioned may have a higher heating value and increase in temperature.

On the other hand, if the axial dimension of the portions where the busbar cavities 90Bb are positioned is made equal to or close to the axial dimension of the portions that are on the both circumferential sides of the busbar cavities 90Bb, it is possible to suppress a partial reduction in the cross-sectional area of the second busbar body portion 90Ba orthogonal to the circumferential direction. Accordingly, it is possible to suppress an increase in the temperature of the portions of the second busbar body portion 90Ba where the busbar cavities 90Bb are positioned.

In FIG. 4, the shape of the busbar protrusions 90Bc, when viewed in the radial direction, is a trapezoidal shape whose upper base is longer than the lower base. There are no particular limitations on the shape of the busbar protrusions 90Bc when viewed in the radial direction, and the shape of the busbar protrusions 90Bc may be other shapes such as a semicircular shape, a semi-oval shape, or a polygonal shape. For example, the shape of the busbar protrusions 90Bc, when viewed in the radial direction, may be the same as the internal shape of the busbar cavities 90Bb when viewed in the radial direction.

The axial dimension of the busbar protrusions 90Bc is equal to the axial dimension of the busbar cavities 90Bb that overlap with the busbar protrusions in the axial direction. Thus, if the radial dimension of the second busbar body portion 90Ba is made uniform, the portions of the second busbar body portion 90Ba where the busbar cavities 90Bb are positioned and the other portions can have a uniform cross-sectional area orthogonal to the circumferential direction.

The cross sectional areas which are orthogonal to the circumferential direction of the second busbar body portion 90Ba are uniform in a portion at which the busbar cavity 90Bb is positioned and in portions that are positioned on both circumferential sides of the busbar cavity 90Bb. This prevents part of the second busbar body portion 90Ba from having a higher heating value and increasing in temperature.

In the preferred embodiment, the upper disposed portions 99 are disposed above the busbar cavities 90Bb. For example, if the upper disposed portions 99 are disposed in the busbar cavity 90Bb, a distance for insulation between the upper disposed portions 99 and the second busbar body portion 90Ba may decrease. On the other hand, in the case where the upper disposed portions 99 are disposed above the busbar cavities 90Bb, a sufficient distance for insulation between the upper disposed portions 99 and the second busbar body portion 90Ba can be ensured.

If the busbar cavities are positioned to a width that is necessary for allowing the first extensions 96A to pass over the second busbar body portion 90Ba in the case where the portions of the second busbar body portion 90Ba where the busbar cavities are positioned are bent at an acute angle, the ratio of the area where the busbar cavities are positioned in the second busbar body portion 90Ba will increase. This may complicate the process of manufacturing the second busbar body portion 90Ba due to, for example, difficulty in making the cross-sectional area orthogonal to the circumferential direction uniform throughout the second busbar body portion 90Ba.

In constrict, with the structure illustrated in FIG. 3, the portions of the second busbar body portion 90Ba where the busbar cavities 90Bb are positioned are curved. Thus, it is possible to reduce the area of the second busbar body portion 90Ba where the busbar cavities 90Bb are positioned, as compared with the case where the portions of the second busbar body portion 90Ba where the busbar cavities 90Bb are positioned are bent at an acute angle. This eases the manufacture of the second busbar body portion 90Ba.

As illustrated in FIG. 4, the lower busbar holder 71 has holder cavities 77 that are recessed downward. At least parts of the busbar protrusions 90Bc are disposed in the holder cavities 77. Thus, an increase in the axial dimension of the lower busbar assembly 70 can be suppressed even if the busbar protrusions 90Bc are provided.

In FIG. 4, the entirety of the busbar protrusions 90Bc are disposed in the holder cavities 77. This structure further suppresses an increase in the axial dimension of the lower busbar assembly 70. The internal shape of the holder cavities 77 is the same as the shape of the busbar protrusions 90Bc. The entirety of the busbar protrusions 90Bc are fitted in the holder cavities 77.

The lower busbar holder 71 has holder protrusions 76 that protrude downward at positions that overlap with the holder cavities 77 in the axial direction. This increases the axial dimension of the portions of the lower busbar holder 71 that are disposed below the busbar protrusions 90Bc. Thus, the busbar protrusions 90Bc can be easily insulated. The holder protrusions 76 have a rectangular shape when viewed in the radial direction.

As illustrated in FIG. 3, the lower holder tubular portion 73 has tubular cavities 73a that are recessed downward. Parts of the first extensions 96A are disposed in the tubular cavities 73a as illustrated in FIGS. 3 and 4. The outer circumferential wall 75 has first circumferential wall cavities 75a and second circumferential wall cavities 75b that are recessed downward, as illustrated in FIG. 3. Parts of the first extensions 96A are disposed in the first circumferential wall cavities 75a. Parts of the second extensions 96B are disposed in the second circumferential wall cavities 75b.

The first extensions 96A extend radially outward from the first busbar body portion 90Aa through the tubular cavities 73a and the first circumferential wall cavities 75a beyond the outer circumferential wall 75. This structure eliminates the need to extend the first extensions 96A far upward in the axial direction from the position of the first busbar body portion 90Aa, thus further reducing the axial dimension of the lower busbar assembly 70 and the size of the lower busbar assembly 70.

The second extensions 96B extend radially outward from the second busbar body portion 90Ba through the second circumferential wall cavities 75b beyond the outer circumferential wall 75. This structure eliminates the need to extend the second extensions 96B far upward in the axial direction from the position of the second busbar body portion 90Ba, thus further reducing the axial dimension of the lower busbar assembly 70 and the size of the lower busbar assembly 70.

In the case where the upper disposed portions are extended upward so as to ensure a distance for insulation from the second busbar body portion, there is a method for bringing the lower busbar assembly as a whole close to the stator 40 as a method for suppressing an increase in the axial dimension and size of the motor. However, the coils 43 are disposed below the lower busbar holder 71 as illustrated in FIG. 3. Thus, such a reduction in the axial distance between the lower busbar assembly 70 and the stator 40 may render it difficult to route the coil ends 43b of the coils 43.

On the other hand, according to the preferred embodiment, the presence of the busbar cavities 90Bb ensures a distance for insulation between the upper disposed portions 99 and the second busbar body portion 90Ba without extending the upper disposed portions 99 upward. As a result, it is possible to suppress an increase in the axial dimension of the motor 10 and, accordingly, an increase in the size of the motor 10 without bringing the lower busbar assembly 70 close to the stator 40. This structure keeps an appropriate axial distance between the lower busbar assembly 70 and the stator 40 and eases the routing of the coil ends 43b.

Even in the case where the holder protrusions 76 are provided as described in the preferred embodiment, the holder protrusions 76 may be provided partially at only positions where the upper disposed portions 99 are disposed.

This avoids a situation where the holder protrusions 76 obstruct the routing of the coil ends 43b during the manufacture of the motor 10.

The present disclosure is not limited to the above-described preferred embodiments, and other configurations may be adopted. In the following description, constituent elements that are similar to those described above may, for example, be given the same reference numerals and may not be described in detail.

Figure 5:
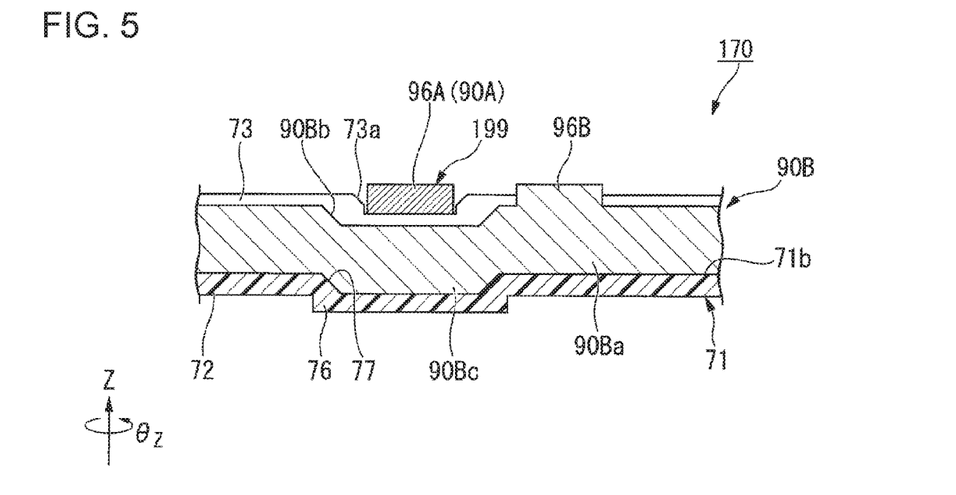
FIG. 5 is a cross-sectional view of part of the lower busbar assembly according to another example of the preferred embodiment.
Figure 6:
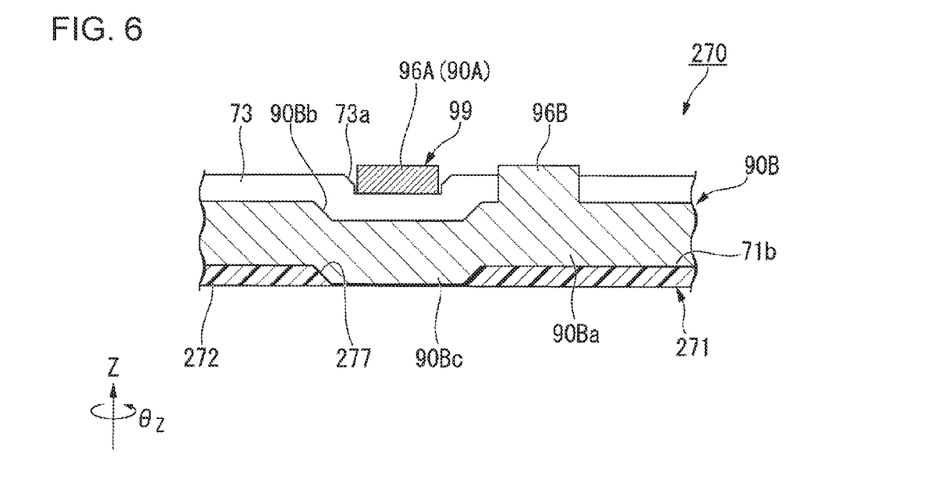
FIG. 6 is a cross-sectional view of part of the lower busbar assembly according to another example of the preferred embodiment.

The lower busbar assembly 70 may have configurations illustrated in FIGS. 5 and 6. As illustrated in FIG. 5, parts of upper disposed portions 199 are disposed in the busbar cavities 90Bb. Thus, the upper disposed portions 199 can be brought closer to the second busbar body portion 90Ba. This reduces the axial dimension of a lower busbar assembly 170 and the size of the lower busbar assembly 170. Accordingly, it is possible to reduce the axial dimension of the motor 10 and the size of the motor 10.

With this configuration, at least parts of the upper disposed portions 199 may be disposed in the busbar cavities 90Bb. For example, the entirety of the upper disposed portions 199 may be disposed in the busbar cavities 90Bb. In this case, the axial length of the lower busbar assembly 170 can be further reduced and the size of the lower busbar assembly 170 as a whole can be reduced. Accordingly, the axial size of the motor 10 can be further reduced.

As illustrated in FIG. 6, a lower busbar holder 271 has holder through holes 277 that penetrate the lower busbar holder 271 in the axial direction. At least parts of the busbar protrusions 90Bc are disposed in the holder through holes 277. This structure suppresses an increase in the axial dimension of the lower busbar assembly 270, even in the presence of the busbar protrusions 90Bc. Moreover, since no holder protrusions 76 are formed, it is possible to suppress an increase in the axial dimension of the lower busbar assembly 270 and an increase in the size of the lower busbar assembly 270.

The entirety of the busbar protrusions 90Bc are disposed in the holder through holes 277. The lower ends of the busbar protrusions 90Bc are disposed above the lower end of the first coil support 272. Thus, even in the presence of the busbar cavities 90Bb and the busbar protrusions 90Bc, the axial dimension and size of the lower busbar assembly 270 are not increased, and insulation between the first busbar 90A and the second busbar 90B can be ensured.

The holder through holes 277 are disposed in the first coil support 272. That is, the holder through holes 277 are holes that penetrate the first coil support 272 in the axial direction. The internal shape of the holder through holes 277, when viewed in the radial direction, is approximately the same as the shape of the busbar protrusions 90Bc.

The upper disposed portions 99 may constitute the whole of the first connection terminals 98A. That is, the upper disposed portions 99 may be at least parts of the first connection terminals 98A. Alternatively, the upper disposed portions 99 may constitute the whole of the first extensions 96A. That is, the upper disposed portions 99 may be at least parts of the first extensions 96A.

The second busbar body portion 90Ba may have a larger radial dimension in the portions where the busbar cavities 90Bb are positioned, instead of having the busbar protrusions 90Bc. This configuration may be employed to achieve a state that the cross sectional areas which are orthogonal to the circumferential direction of the second busbar body portion 90Ba may be uniform in a portion at which the busbar cavity 90Bb is positioned and in portions that are positioned on both circumferential sides of the busbar cavity 90Bb.

The number of rotor cores included in the rotor 30 may be one. The motor 10 may, for example, be an outer rotor type motor.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A motor comprising:
a shaft disposed along a central axis that extends in an up-down direction;
a rotor assembly mounted on the shaft;
a stator radially facing the rotor assembly with a clearance therebetween; and
a plurality of busbars electrically connected to the stator, wherein the busbars include a first busbar and a second busbar,
the first busbar has an upper disposed portion that is disposed above the second busbar, and
the second busbar has a busbar cavity that is recessed downward at a position that overlaps with the upper disposed portion in an axial direction.

2. The motor according to claim 1, wherein
the first busbar has a first busbar body portion that extends in a circumferential direction, and a first connection terminal that extends in a radial direction from the first busbar body portion,
the second busbar has a second busbar body portion that extends in the circumferential direction, and a second connection terminal that extends in the radial direction from the second busbar body portion, and
the first busbar body portion and the second busbar body portion are disposed along a plane orthogonal to the central axis.

3. The motor according to claim 2, wherein
the first busbar body portion and the second busbar body portion are at the same position in an axial direction.

4. The motor according to claim 2, wherein
the first busbar body portion and the second busbar body portion are aligned in the radial direction,
the upper disposed portion is at least part of the first connection terminal, and
the busbar cavity is positioned in the second busbar body portion.

5. The motor according to claim 4, wherein
the second busbar body portion has a busbar protrusion that protrudes downward at a position that overlaps with the busbar cavity in an axial direction.

6. The motor according to claim 5, further comprising:
a busbar holder that holds the busbars,
wherein the busbar holder has a holder cavity that is recessed downward, and
at least part of the busbar protrusion is disposed in the holder cavity.

7. The motor according to claim 6, wherein
the busbar holder has a holder protrusion that protrudes downward at a position that overlaps with the holder cavity in an axial direction.

8. The motor according to claim 5, further comprising:
a busbar holder that holds the busbars,
wherein the busbar holder has a holder-through-hole that penetrates the busbar holder in an axial direction, and
at least part of the busbar protrusion is disposed in the holder through hole.

9. The motor according to claim 4, wherein cross sectional areas which are orthogonal to the circumferential direction of the second busbar body portion are uniform in a portion at which the busbar cavity is positioned and in portions that are positioned on both circumferential sides of the busbar cavity.

10. The motor according to claim 4, wherein
the upper disposed portion is disposed above the busbar cavity.

11. The motor according to claim 4, wherein
at least part of the upper disposed portion is disposed in the busbar cavity.

12. The motor according to claim 11, wherein
an entirety of the upper disposed portion is disposed in the busbar cavity.

13. The motor according to claim 4, wherein
the stator includes a plurality of coils,
the coils each have a coil end that is an end of a conductive wire,
the first connection terminal includes a first extension that extends in the radial direction from the first busbar body portion, and a first connector that is disposed at a radial end of the first extension and connected to the coil end,
the second connection terminal includes a second extension that extends in the radial direction from the second busbar body portion, and a second connector that is disposed at a radial end of the second extension and connected to the coil end, and
the upper disposed portion is at least part of the first extension.

14. The motor according to claim 13, wherein
the first connector and the second connector are at the same position in an axial direction.

15. The motor according to claim 4, wherein
a portion at which the busbar cavity is positioned on the second busbar body portion is curved.

\* \* \* \* \*